United States Patent
Kaneko et al.

(10) Patent No.: US 10,340,537 B2
(45) Date of Patent: Jul. 2, 2019

(54) FUEL CELL SYSTEM AND CONTROL METHOD FOR THE SAME

(71) Applicant: Panasonic Intellectual Property Management Co., Ltd., Osaka (JP)

(72) Inventors: Yasushi Kaneko, Osaka (JP); Kunihiro Ukai, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 68 days.

(21) Appl. No.: 14/938,008

(22) Filed: Nov. 11, 2015

(65) Prior Publication Data
US 2016/0156048 A1 Jun. 2, 2016

(30) Foreign Application Priority Data

Nov. 27, 2014 (JP) .................................. 2014-240315

(51) Int. Cl.
 *H01M 8/04* (2016.01)
 *H01M 8/06* (2016.01)
 (Continued)

(52) U.S. Cl.
 CPC ... *H01M 8/04223* (2013.01); *H01M 8/04022* (2013.01); *H01M 8/04089* (2013.01);
 (Continued)

(58) Field of Classification Search
 CPC ......... H01M 8/04089; H01M 8/04201; H01M 8/04223; H01M 2008/1293;
 (Continued)

(56) References Cited

U.S. PATENT DOCUMENTS

2012/0000435 A1* 1/2012 Scotto ............... H01M 8/04223
  123/3
2012/0178006 A1* 7/2012 Kani ...................... C01B 3/384
  429/423
(Continued)

FOREIGN PATENT DOCUMENTS

EP 2767506 8/2014
WO 2012/164897 12/2012

OTHER PUBLICATIONS

The Extended European Search Report dated Mar. 30, 2016 for the related European Patent Application No. 15194464.2.

*Primary Examiner* — Jonathan G Jelsma
*Assistant Examiner* — Omar M Kekia
(74) *Attorney, Agent, or Firm* — McDermott Will & Emery LLP

(57) ABSTRACT

A fuel cell system includes a reformer, a raw-material supplier, a desulfurizer, a flow controller, a vapor supplier, a fuel cell, a combustor, and a controller. After the raw-material supplier supplies a raw material at the startup of the fuel cell system, the controller causes the combustor to combust the raw material exhausted as off-gas from the fuel cell, subsequently causes the flow controller to allow gas exhausted from the reformer to flow through a recycle gas passage, and thereafter causes the vapor supplier to supply vapor, or the controller causes the flow controller to allow the gas exhausted from the reformer to flow through the recycle gas passage, subsequently causes the combustor to combust the raw material exhausted as the off-gas from the fuel cell, and thereafter causes the vapor supplier to supply the vapor.

2 Claims, 6 Drawing Sheets

(51) Int. Cl.
*H01M 8/04223* (2016.01)
*H01M 8/0612* (2016.01)
*H01M 8/0662* (2016.01)
*H01M 8/04014* (2016.01)
*H01M 8/04746* (2016.01)
*H01M 8/04302* (2016.01)
*H01M 8/04089* (2016.01)
*H01M 8/04082* (2016.01)
*H01M 8/124* (2016.01)

(52) U.S. Cl.
CPC ... *H01M 8/04201* (2013.01); *H01M 8/04302* (2016.02); *H01M 8/04776* (2013.01); *H01M 8/0618* (2013.01); *H01M 8/0675* (2013.01); *H01M 2008/1293* (2013.01)

(58) Field of Classification Search
CPC .......... H01M 8/04302; H01M 8/0675; H01M 8/04022; H01M 8/04776; H01M 8/0618
USPC ....................................................... 429/410
See application file for complete search history.

(56) References Cited

U.S. PATENT DOCUMENTS

2014/0072888 A1  3/2014  Harada et al.
2015/0180055 A1* 6/2015  Nakata .............. H01M 8/04014
                                                    429/410

* cited by examiner

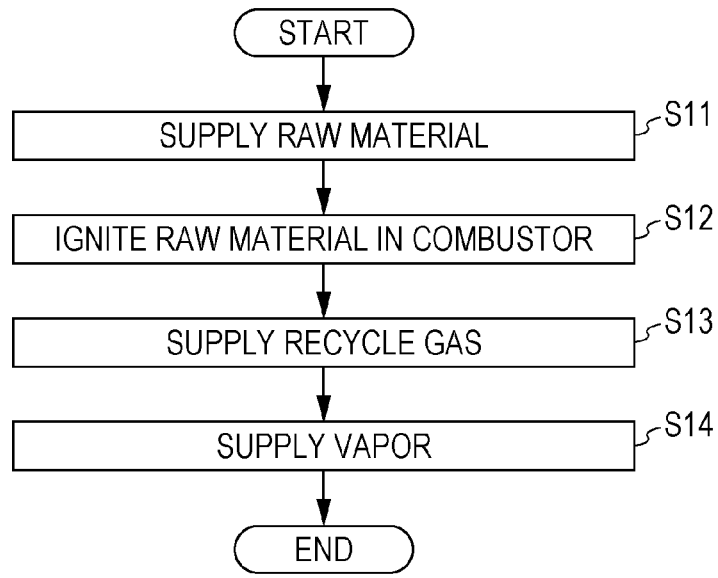
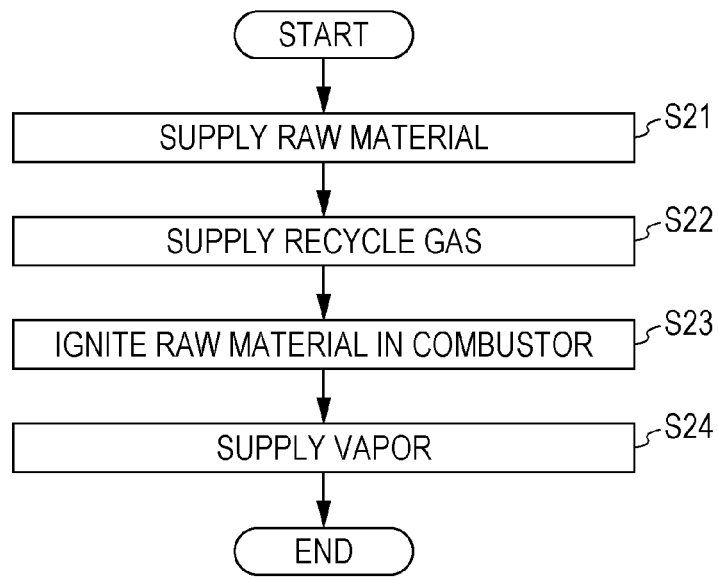

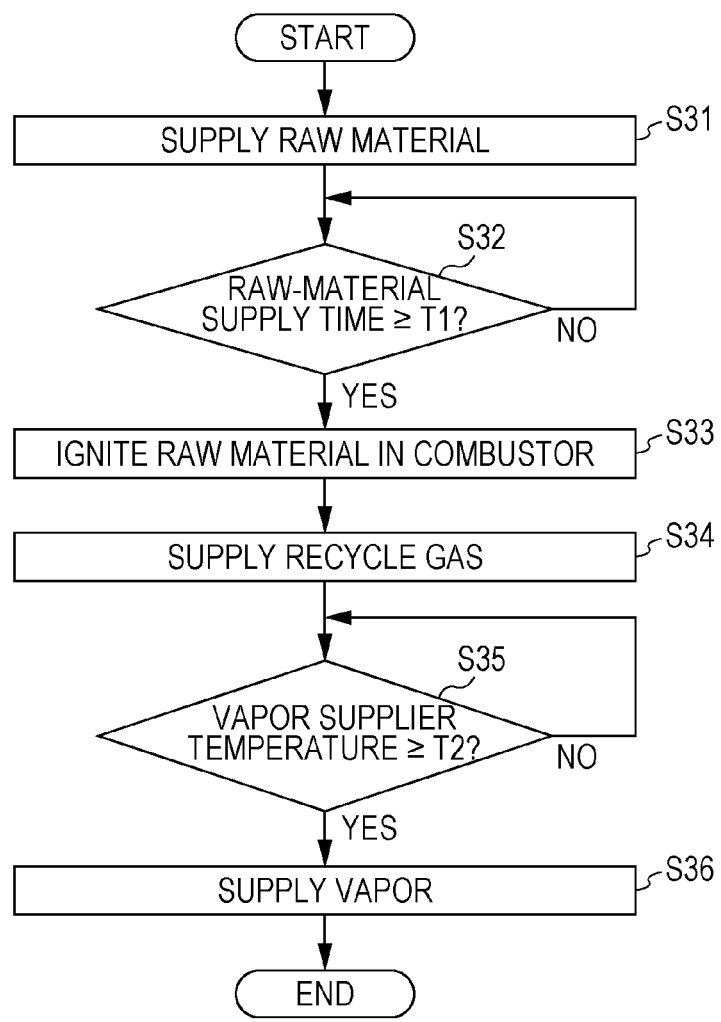

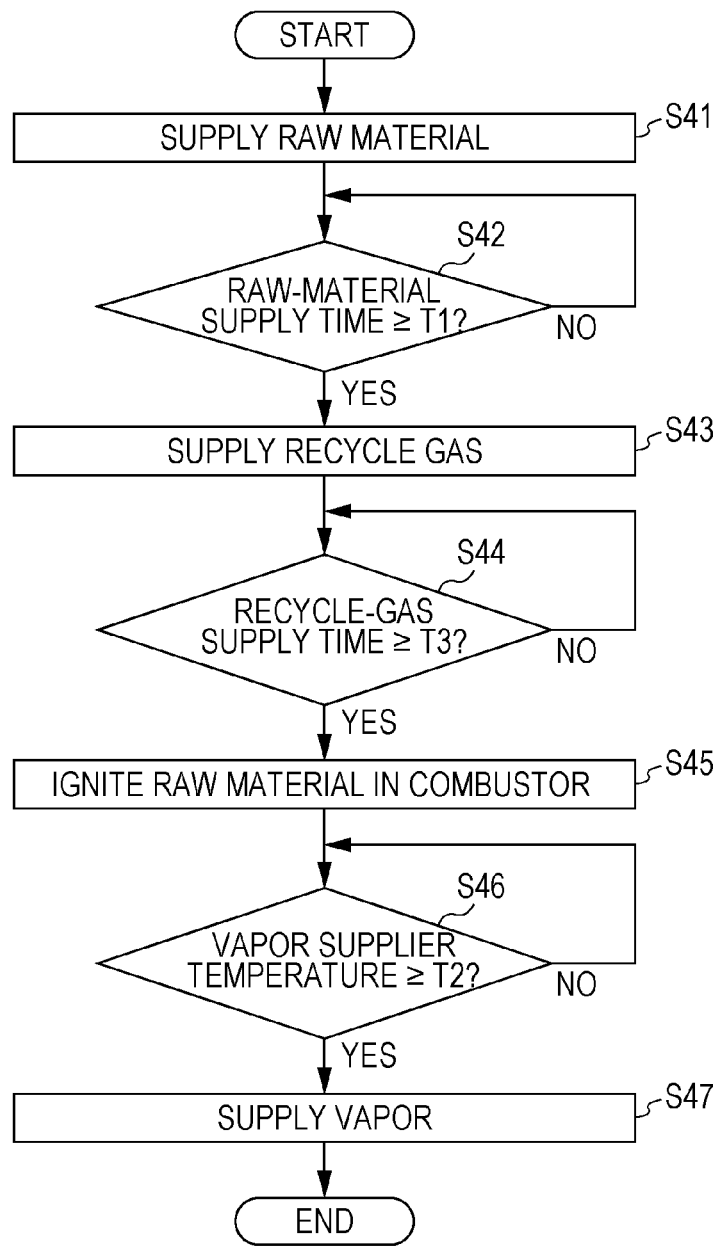

FUEL CELL SYSTEM AND CONTROL METHOD FOR THE SAME

BACKGROUND

1. Technical Field

The present disclosure relates to a fuel cell system and a control method for the same.

2. Description of the Related Art

Hydrogen generators are used, for example, to supply a fuel cell with a hydrogen-containing gas as a fuel gas. Such hydrogen generators include a reformer that generates a hydrogen-containing gas by typically causing a reaction (reforming reaction) between a raw material and water. City gas or a similar gas is used as the raw material, but the city gas contains a sulfur compound used as an odorant component or the like. The sulfur compound is a poisoner to a reforming catalyst used for the reforming reaction and thus needs to be removed in some way or other.

Hence, there is proposed a hydrogen generator in which a sulfur compound is removed by using room-temperature adsorption and hydrodesulfurization that uses hydrogen (see, for example, International Publication No. WO 2012/164897).

SUMMARY

One non-limiting and exemplary embodiment provides a fuel cell system that prevents deterioration of the combustion state of a combustor at the startup of the fuel cell system and a control method for the fuel cell system.

In one general aspect, the techniques disclosed here feature a fuel cell system including a reformer that generates a hydrogen-containing gas by using a raw material, a raw-material supplier that supplies the raw material to the reformer, a desulfurizer that desulfurizes, by using hydrodesulfurization, a sulfur compound contained in the raw material supplied to the reformer, a recycle gas passage for supplying the desulfurizer with part of gas exhausted from the reformer, a flow controller that controls flow of the gas in the recycle gas passage, a vapor supplier that supplies vapor to the reformer, a fuel cell that causes a reaction of the hydrogen-containing gas generated by the reformer, a combustor that ignites and combusts off-gas exhausted from the fuel cell, and a controller. After causing the raw-material supplier to supply the raw material at a startup of the fuel cell system, the controller performs control such that the raw material exhausted as the off-gas via the fuel cell is combusted in the combustor, the flow controller subsequently causes the part of the gas exhausted from the reformer to flow through the recycle gas passage, and the vapor supplier thereafter supplies the vapor to the reformer, or such that the flow controller causes the part of the gas exhausted from the reformer to flow through the recycle gas passage, the raw material exhausted as the off-gas via the fuel cell is subsequently combusted in the combustor, and the vapor supplier thereafter supplies the vapor to the reformer.

According to the aspect of the present disclosure, an advantageous effect is exerted in which deterioration of the combustion state of the combustor can be prevented at the startup of the fuel cell system.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart illustrating an example of a control method for the fuel cell system according to the embodiment of the present disclosure;

FIG. 4 is a flowchart illustrating an example of a control method for the fuel cell system according to a modification of the embodiment;

FIG. 6 is a flowchart illustrating an example of a control method for the fuel cell system according to the example of the embodiment; and FIG. 7 is a flowchart illustrating an example of the fuel cell system according to a modification of the example of the embodiment.

DETAILED DESCRIPTION

Figure 1:
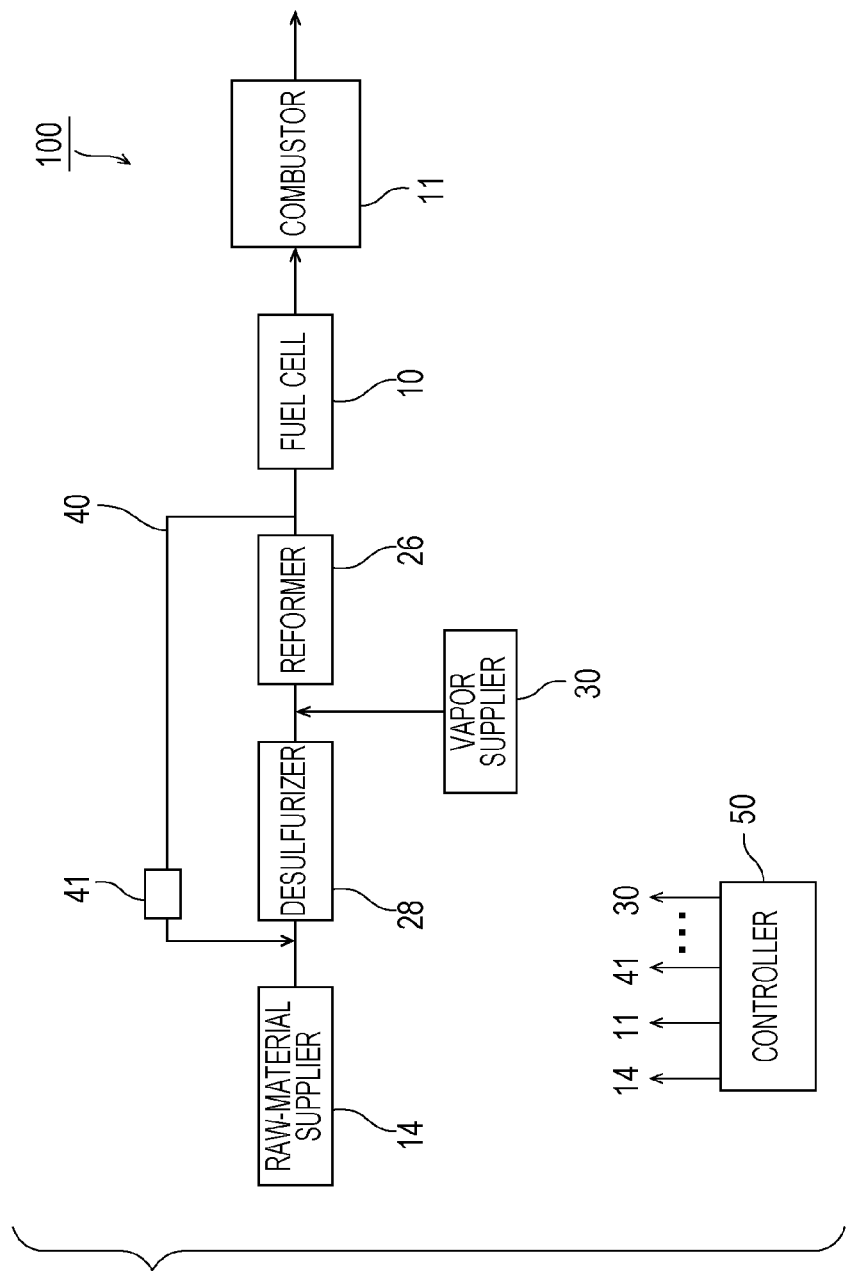
FIG. 1 is a block diagram illustrating an example of a schematic configuration of a fuel cell system according to an embodiment of the present disclosure.

Underlying Knowledge Forming Basis of the Present Disclosure

The inventors of the present invention have earnestly studied the combustion state of a combustor and consequently obtained the following findings.

First, hydrogen generators are used, for example, to supply a fuel cell with a hydrogen-containing gas. Examples of a raw material used when the hydrogen generator generates the hydrogen-containing gas include, liquefied petroleum gas (LPG), liquefied natural gas (LNG), city gas, shale gas, and methane hydrate.

Each hydrogen generator includes a reformer, and the reformer generates a hydrogen-containing gas (reformed gas) by causing a reforming reaction between a raw material and vapor at a temperature of, for example, 600 to 700° C. by using, for example, a Ru catalyst or a Ni catalyst.

Meanwhile, the raw material such as the city gas or LPG has an odorant containing a sulfur component added thereto for detecting a leakage of the raw material. In some cases, the raw material contains a sulfur compound derived from the raw material. The sulfur-based odorant and the naturally derived sulfur compound (collectively referred to as a "sulfur compound") poison a catalyst such as the Ru catalyst or the Ni catalyst used in the reformer and inhibit the reforming reaction. Further, the sulfur compound might poison, for example, an anode of a fuel cell stack of a fuel cell provided in the subsequent stage of the hydrogen generator and deteriorate the performance of the fuel cell. Accordingly, the hydrogen generator is typically provided with a desulfurizer for removing a sulfur compound from a raw material that has not yet been put in the reformer.

Hydrogen Generation

The fuel cell stack of the fuel cell includes a cell including, for example, an anode (fuel pole), an electrolyte, and a cathode (air pole). The anode is supplied with, for example, methane that is a fuel or a hydrogen-containing gas supplied from the reformer. The cathode is supplied with, for example, air as the oxidant gas. Oxygen in the air dissociates at the interface between the cathode and the electrolyte and moves and diffuses in the electrolyte. The diffusing oxygen ions react with hydrogen on the anode side at the interface between the electrolyte and the anode, and water is thus generated. Electrons emitted in the reaction are harvested as power.

Meanwhile, off-gas exhausted from the fuel cell described above contains a fuel (hydrogen-containing gas) that has not yet reacted and thus needs to be combusted before being exhausted into the atmosphere. The combustor that combusts the off-gas needs to have a function of combusting the combustible gas and releasing the combustible gas safely into the atmosphere and thus needs to be continuously maintained in a stable combustion state. The term "off-gas" herein denotes any gas exhausted from the fuel cell. For example, suppose a case where the fuel cell is in a power generation state. In this case, gas exhausted from the fuel cell after hydrogen is consumed for the power generation is referred to as off-gas. The off-gas is gas exhausted via the fuel cell and may thus be gas that has not yet reacted in the fuel cell.

Meanwhile, in the configuration disclosed in International Publication No. WO 2012/164897, when the hydrogen generator is started, the temperatures of the reformer and the hydrodesulfurizer are increased. When the temperature of the reformer reaches a temperature at which the hydrogen-containing gas can be generated, vapor and a raw material are supplied to the reformer. The reformer subsequently starts generation of the hydrogen-containing gas. Further, after the temperature of the hydrodesulfurizer is increased to a temperature at which hydrodesulfurization can be performed, part of the hydrogen-containing gas generated by the reformer is supplied to the hydrodesulfurizer. The hydrodesulfurizer thereby can desulfurize the odorant component from the supplied raw material gas to supply the hydro-containing gas to the reformer.

In the configuration disclosed in International Publication No. WO 2012/164897, after the temperature of the hydrodesulfurizer is increased to the temperature at which the hydrodesulfurization can be performed, the part of the hydrogen-containing gas generated by the reformer is supplied to the hydrodesulfurizer. Since the part of the hydrogen-containing gas is supplied to the hydrodesulfurizer, the flow of the flowing hydrogen-containing gas is temporarily reduced at this time. Accordingly, the flow of the off-gas exhausted via the fuel cell provided in the subsequent stage of the hydrogen generator is also temporarily reduced.

It has thus been found that there is a possibility that in the configuration in which the off-gas is combusted in the combustor, the temporary reduction in flow of the off-gas might cause a deterioration of the combustion state of the combustor and thus an excessive exhaust of CO gas or a fire.

In addition, in a case where vapor is supplied to the reformer before ignition is performed in the combustor, the off-gas exhausted from the fuel cell provided in the subsequent stage of the reformer is a raw material that has a high moisture content. As described above, it has been found that in the case where the off-gas (raw material) exhausted from the fuel cell has a high moisture content, the combustion state of the combustor is deteriorated.

It has been found from the findings above that in the case where part of the gas exhausted from the reformer is supplied to the hydrodesulfurizer after vapor is supplied to the reformer at the startup of the hydrogen generator, the combustor is in the most deteriorated combustion state.

As described above, it has been found that the timing of supplying vapor to the reformer or the timing of supplying the hydrodesulfurizer with part of the gas exhausted from the reformer remain a matter of study to prevent the deterioration of the combustion state of the combustor, and the inventors thus reached the present disclosure. Hereinafter, an embodiment of the present disclosure will be described with reference to the attached drawings.

The embodiment to be described below represents specific examples of the present disclosure. Numerical values, shapes, materials, components, arrangement locations and a connection mode of the components, steps, the order of the steps, and the like that are described in the embodiment below are merely examples and do not limit the present disclosure. If a component that is not described in an independent claim corresponding to the highest level description of the present disclosure is described in the following embodiment, the component is described as an optional component. For the components denoted by the same reference numerals in the drawings, description thereof might be omitted. Moreover, the drawings schematically illustrate the components for easy understanding, and the shapes, dimensions, and the like might not be illustrated correctly. Regarding a manufacturing method, the order or the like of steps can be changed as appropriate, and another publicly known steps can be added to the described steps.

Embodiment

A fuel cell system according to an embodiment includes a reformer that generates a hydrogen-containing gas by using a raw material, a raw-material supplier that supplies the raw material to the reformer, a desulfurizer that desulfurizes, by using hydrodesulfurization, a sulfur compound contained in the raw material supplied to the reformer, a recycle gas passage for supplying the desulfurizer with part of gas exhausted from the reformer, a flow controller that controls flow of the gas in the recycle gas passage, a vapor supplier that supplies vapor to the reformer, a fuel cell that causes a reaction of the hydrogen-containing gas generated by the reformer, a combustor that ignites and combusts off-gas exhausted from the fuel cell, and a controller. After causing the raw-material supplier to supply the raw material at a startup of the fuel cell system, the controller performs control such that the raw material exhausted as the off-gas via the fuel cell is combusted in the combustor, the flow controller subsequently causes the part of the gas exhausted from the reformer to flow through the recycle gas passage, and the vapor supplier thereafter supplies the vapor to the reformer, or such that the flow controller causes the part of the gas exhausted from the reformer to flow through the recycle gas passage, the raw material exhausted as the off-gas via the fuel cell is subsequently combusted in the combustor, and the vapor supplier thereafter supplies the vapor to the reformer.

As described above, the off-gas (raw material) exhausted from the fuel cell is combusted before the supply of the vapor is started in the fuel cell system according to the embodiment. The raw material having a high moisture content is thus not combusted, and deterioration of the combustion state can be prevented.

Accordingly, the fuel cell system according to the embodiment exerts the advantageous effect in which deterioration of the combustion state of the combustor can be prevented at the startup of the fuel cell system.

The control method for the fuel cell system in the embodiment is a control method for a fuel cell system including a reformer that generates a hydrogen-containing gas by using a raw material, a raw-material supplier that supplies the raw material to the reformer, a desulfurizer that desulfurizes, by using hydrodesulfurization, a sulfur compound contained in the raw material supplied to the reformer, a recycle gas passage for supplying the desulfurizer with part of gas exhausted from the reformer, a flow controller that controls flow of the gas in the recycle gas passage, a vapor supplier that supplies vapor to the reformer, a fuel cell that causes a reaction of the hydrogen-containing gas generated by the reformer, a combustor that ignites and combusts off-gas exhausted from the fuel cell, and a controller. The control method includes, at a startup of the fuel cell system, supplying the raw material by the raw-material supplier, combusting, by the combustor, the off-gas exhausted via the fuel cell, causing, by the flow controller, the part of the gas exhausted from the reformer to flow through the recycle gas passage, and supplying the vapor to the reformer by the vapor supplier. After the supplying of the raw material by the raw-material supplier is performed, the combusting, by the combustor, of the raw material as the off-gas exhausted via the fuel cell is performed, the causing, by the flow controller, of the part of the gas exhausted from the reformer to flow through the recycle gas passage is subsequently performed, and the supplying of the vapor to the reformer by the vapor supplier is thereafter performed, or the causing, by the flow controller, of the part of the gas exhausted from the reformer to flow through the recycle gas passage is performed, the combusting, by the combustor, of the raw material as the off-gas exhausted via the fuel cell is subsequently performed, and the supplying of the vapor to the reformer by the vapor supplier is thereafter performed.

As described above, the off-gas (raw material) exhausted from the fuel cell is combusted before the supply of the vapor is started in the control method for the fuel cell system according to the embodiment. The raw material having a high moisture content is thus not combusted, and deterioration of the combustion state can be prevented.

Accordingly, the control method for the fuel cell system according to the embodiment exerts the advantageous effect in which deterioration of the combustion state of the combustor can be prevented at the startup of the fuel cell system.

Device Configuration

A schematic configuration of a fuel cell system 100 according to the embodiment will be described with reference to FIG. 1. FIG. 1 is a block diagram illustrating an example of the schematic configuration of the fuel cell system 100 according to the embodiment of the present disclosure.

In the example illustrated in FIG. 1, the fuel cell system 100 includes a reformer 26, a raw-material supplier 14, a desulfurizer 28, a vapor supplier 30, a recycle gas passage 40, a flow controller 41, a fuel cell 10, a combustor 11, and a controller 50.

The reformer 26 generates a hydrogen-containing gas by using a raw material. Specifically, the reformer 26 causes a reforming reaction of the raw material gas, and the hydrogen-containing gas is thus generated. Any mode of the reforming reaction may be used, and examples of the reforming reaction include a vapor reforming reaction and an autothermal reaction.

For example, a container of the reformer 26 may be filled with a reforming catalyst. As the reforming catalyst, alumina supports may be used in which, for example, at least one of nickel, ruthenium, platinum, and rhodium is impregnated.

Note that the reforming catalyst is not limited to this example. Any material may be used as long as a reforming catalyst can advance the reforming reaction when the reforming catalyst is maintained in an optimum temperature range.

The raw-material supplier 14 supplies the reformer 26 with the raw material. The raw-material supplier 14 includes, for example, a booster and a flow regulating valve but may include either the booster or the flow regulating valve. For example, a fixed displacement pump is used as the booster, but the booster is not limited to this. A raw material for power generation is supplied from a power-generation-raw-material supply source. The power-generation-raw-material supply source may have a predetermined supply pressure. Examples of the power-generation-raw-material supply source having a predetermined pressure include a raw-material-gas cylinder and a raw-material-gas infrastructure.

Examples of the raw material include a substance containing an organic compound formed of at least elements of carbon and hydrogen. Specifically, examples of the raw material include hydrocarbons such as natural gas, city gas, LPG, LNG, propane gas, butane, and gas containing methane as a main component, alcohols such as methanol and ethanol, and kerosene. The term "city gas" denotes gas supplied from a gas company to households through pipes. In a case where a liquid such as kerosene or alcohol is used as the raw material, the raw material may be heated to be gasified before being supplied to the reformer.

The desulfurizer 28 performs hydrodesulfurization on a sulfur compound contained in the raw material supplied to the reformer 26. A container of the desulfurizer 28 may be filled with a hydrodesulfurization agent. Examples of the hydrodesulfurization agent used for the filling include a CuZn-based catalyst that has both of a function of converting the sulfur compound into hydrogen sulfide and a function of adsorbing hydrogen sulfide. The hydrodesulfurization agent is not limited to this example and may be formed of a CoMo-based catalyst and one of a ZnO-based catalyst and a CuZn-based catalyst that is provided downstream of the CoMo-based catalyst. The CoMo-based catalyst converts the sulfur compound in the raw material gas into hydrogen sulfide, and the ZnO-based catalyst and the CuZn-based catalyst are sulfur adsorbents for removing hydrogen sulfide by adsorption.

The sulfur compound may be artificially added as an odorant component to the raw material or may be a natural sulfur compound derived from the raw material. Specifically, examples of the sulfur compound include tertiary-butylmercaptan (TBM), dimethyl sulfide (DMS), tetrahydrothiophene (THT), carbonyl sulfide (COS), and hydrogen sulfide (hydrogen sulfide).

In a case where the hydrodesulfurization agent contains copper or zinc, the hydrodesulfurizer works in an appropriate temperature range, for example, from about 150° C. to 350° C.

Note that the desulfurizer 28 may further contain a desulfurization sorbent. If the container further contains the desulfurization sorbent, an Ag-zeolite catalyst or similar catalyst is used, and the desulfurizer 28 can be used at normal temperature.

The vapor supplier 30 supplies the reformer 26 with vapor. Specifically, water supplied, for example, from the outside is evaporated in the vapor supplier 30, and the vapor supplier 30 supplies the reformer 26 with vapor needed for the reforming reaction. The heat source for generating vapor is not particularly limited. The vapor supplier 30 may be, for example, separately provided with a heater (not illustrated) such as an electric heater as the heat source or may utilize heat of any one of the combustor 11, the reformer 26, and the fuel cell 10. Alternatively, the vapor supplier 30 may generate vapor by optionally combining heating by the heater, using heat of the combustor 11, the reformer 26, the fuel cell 10, or other units, and the like.

In a case where the reformer 26 uses an autothermal reaction for the reforming reaction, an air supplier (not illustrated) that supplies the reformer 26 with air may further be provided.

The recycle gas passage 40 is a passage for supplying part of the gas exhausted from the reformer 26 to the desulfurizer 28. As illustrated in FIG. 1, the recycle gas passage 40 branches from a gas passage connecting the reformer 26 and the fuel cell 10 and joins a gas passage connecting the raw-material supplier 14 and the desulfurizer 28. In a case where the hydrogen-containing gas is generated because the reforming reaction has progressed in the reformer 26, the part of the hydrogen-containing gas flows through the recycle gas passage 40 to be supplied to the desulfurizer 28. In contrast, in a case where the raw material is supplied to the reformer 26 in a state where the reforming reaction has not been progressed in the reformer 26, part of the raw material flows through the recycle gas passage 40 to be supplied to the desulfurizer 28.

The flow controller 41 controls the flow of the gas in the recycle gas passage 40. The flow controller 41 is disposed, for example, in the recycle gas passage 40. Examples of the flow controller 41 include an on-off valve having a movable mechanism that allows the recycle gas passage 40 to be opened or closed in response to a control instruction given from the controller 50.

The fuel cell 10 is used to cause the reaction of the hydrogen-containing gas generated in the reformer 26.

The combustor 11 is used to ignite and combust off-gas exhausted from the fuel cell 10. An oxidizer supply path may be provided to the combustor 11 to provide, from the outside, oxidant gas for combusting the off-gas exhausted from the fuel cell 10 but is not particularly illustrated in FIG. 1.

The controller 50 performs control on components of the fuel cell system 100 and includes a processor and a storage having a control program stored therein. Examples of the controller 50 include a microcontroller and a programmable logic controller (PLC). Examples of the processor include a microprocessing unit (MPU) and a central processing unit (CPU). Examples of the storage include a non-volatile memory. The controller 50 may have a configuration in which a single controller performs centralized control or in which a plurality of controllers perform distribution control in cooperation with each other.

Figure 2:
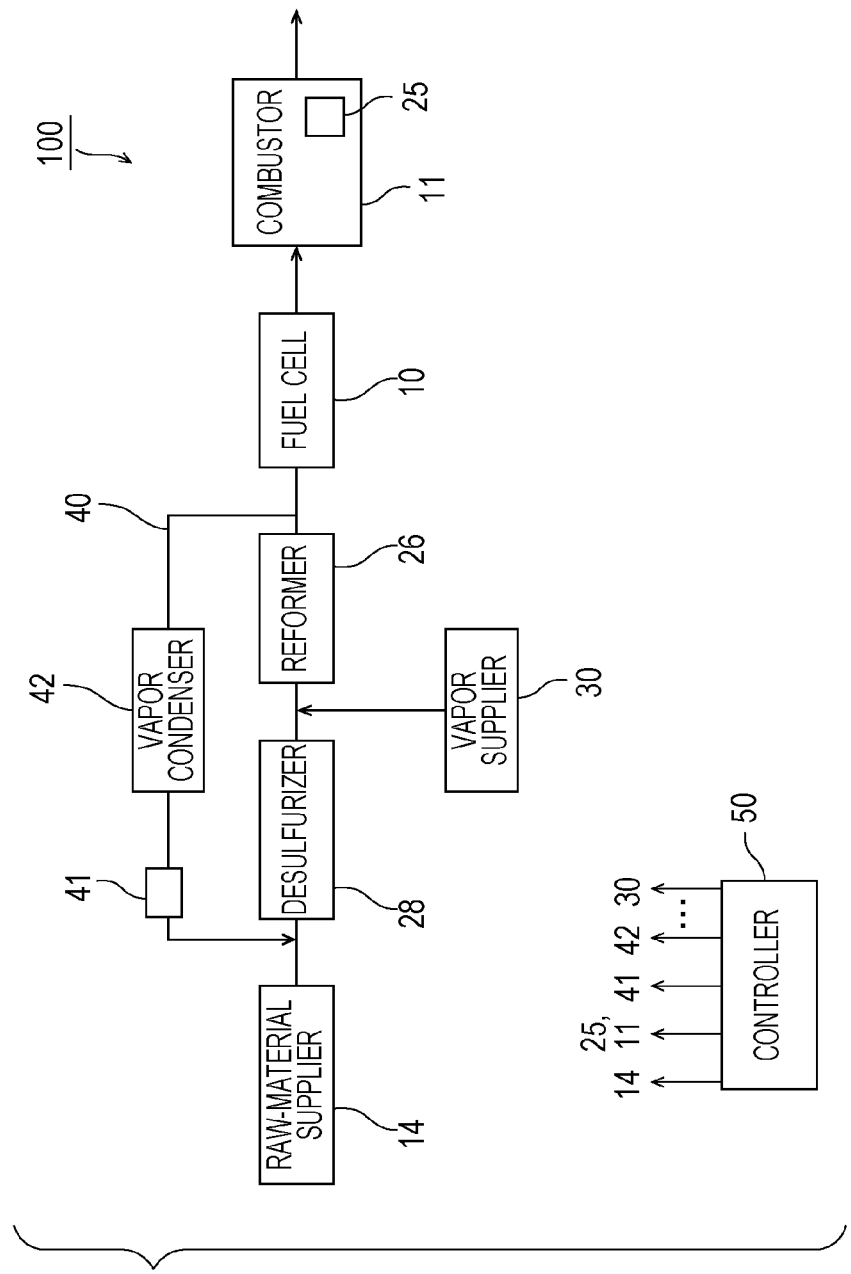
FIG. 2 is a block diagram illustrating an example of a schematic configuration of the fuel cell system according to the embodiment of the present disclosure.

The fuel cell system 100 illustrated in FIG. 1 may have a configuration, for example, as illustrated in FIG. 2 in which the recycle gas passage 40 is provided with a vapor condenser 42. FIG. 2 is a block diagram illustrating an example of a schematic configuration of the fuel cell system 100 according to the embodiment of the present disclosure. The vapor condenser 42 condenses vapor contained in the hydrogen-containing gas flowing through the recycle gas passage 40, and the vapor is removed. The configuration in which the recycle gas passage 40 is provided with the vapor condenser 42 prevents the recycle gas passage 40 from clogging with dew condensation water. The vapor condenser 42 may be an electronically controlled chiller or a water-cooled condenser.

The combustor 11 may also include an igniter 25 for igniting the off-gas, as illustrated in FIG. 2. The ignition by the igniter 25 may be controlled in accordance with the control instruction given from the controller 50.

Control Method Performed at Startup

A control method performed at the startup of the fuel cell system 100 according to the embodiment will be described with reference to FIG. 3. FIG. 3 is a flowchart illustrating an example of the control method for the fuel cell system 100 according to the embodiment of the present disclosure. The control method illustrated in FIG. 3 can be implemented in such a manner that, for example, the controller 50 reads and executes a program stored in a storage (not illustrated).

First, the controller 50 instructs the fuel cell system 100 to start (START). After the raw-material supplier 14 becomes ready to supply the raw material, the raw-material supplier 14 supplies the raw material in response to a control instruction from the controller 50 (S11). Thereafter, the igniter 25 ignites and combusts the raw material (off-gas) in the combustor 11 in response to a control instruction from the controller 50, the raw material (off-gas) being exhausted from the fuel cell 10 (step S12). After the combustion of the raw material (off-gas) is started, the flow controller 41 opens the recycle gas passage 40 that is in a closed state in response to a control instruction from the controller 50. This causes the gas (raw material) to start flowing as recycle gas through the recycle gas passage 40, that is, supply of the recycle gas to the recycle gas passage 40 is started (S13). The vapor supplier 30 supplies the reformer 26 with vapor in response to a control instruction from the controller 50 (S14). As described above, the control process performed at the startup of the fuel cell system 100 is completed (END).

In the fuel cell system 100 according to the embodiment as described above, when the fuel cell system 100 is started, the controller 50 controls the vapor supplier 30 in such a manner that vapor is supplied after the raw material exhausted as the off-gas via the fuel cell 10 is combusted in the combustor 11. This enables the raw material (off-gas) exhausted from the reformer 26 to be combusted in the combustor 11 before the vapor supply is started. Accordingly, when the raw material has a high moisture content, the combustion of the raw material in the combustor 11 can be prevented, and the deterioration of the combustion state of the combustor 11 can thus be prevented. This can minimize an increase in density of the CO gas in the combusted and exhausted gas and prevent a fire in the combustor 11.

Note that the order of the steps described for the control method performed at the startup of the fuel cell system 100 according to the embodiment is not limited to this order. Another control method for the fuel cell system 100 performed at the startup of the fuel cell system 100 in a modification of the embodiment is performed in an order different from the order of the steps described above. The method will hereinafter be described.

Modification of Embodiment

The modification of the fuel cell system 100 according to the embodiment will be described with reference to FIG. 4. In the modification of the embodiment, the control performed at the startup of the fuel cell system 100 is performed in an order different from the order of the steps illustrated in FIG. 3. FIG. 4 is a flowchart illustrating an example of a control method for the fuel cell system 100 according to the modification of the embodiment. The control method illustrated in FIG. 4 can be implemented in such a manner that, for example, the controller 50 reads and executes a program stored in the storage (not illustrated).

First, the controller 50 instructs the fuel cell system 100 in the modification to start (START). After the raw-material supplier 14 becomes ready to supply the raw material, the raw-material supplier 14 supplies the raw material in response to a control instruction from the controller 50 (S21). Thereafter, the flow controller 41 opens the recycle gas passage 40 that is in the closed state in response to a control instruction from the controller 50. This causes the gas (raw material) to start flowing as the recycle gas through the recycle gas passage 40, that is, supply of the recycle gas to the recycle gas passage 40 is started (S22). After the recycle gas is continuously supplied, the recycle gas passage 40 is filled with the raw material.

The igniter 25 ignites and combusts the raw material (off-gas) in the combustor 11 in response to a control instruction from the controller 50, the raw material (off-gas) being exhausted from the fuel cell 10 (step S23). After the combustion of the raw material (off-gas) is started, the vapor supplier 30 supplies the reformer 26 with vapor in response to a control instruction from the controller 50 (S24). As described above, the control process performed at the startup of the fuel cell system 100 is completed (END).

In the fuel cell system 100 according to the modification as described above, when the fuel cell system 100 is started, the controller 50 controls the vapor supplier 30 in such a manner that vapor is supplied after the raw material exhausted as the off-gas via the fuel cell 10 is combusted in the combustor 11. This enables the raw material (off-gas) exhausted from the reformer 26 to be combusted in the combustor 11 before the vapor supply is started. Accordingly, when the raw material has a high moisture content, the combustion of the raw material in the combustor 11 can be prevented, and the deterioration of the combustion state of the combustor 11 can thus be prevented.

Moreover, the controller 50 controls the flow controller 41 to cause the part of the gas (raw material) exhausted from the reformer 26 to flow through the recycle gas passage 40 before the raw material exhausted via the fuel cell 10 is combusted in the combustor 11. This enables the recycle gas passage 40 to be full of the gas (raw material) exhausted from the reformer 26. This can prevent fluctuation of an amount of the gas to be supplied to the combustor 11, the fluctuation being caused by flowing of the part of the gas into the recycle gas passage 40 during the combustion in the combustor 11. Accordingly, the deterioration of the combustion state of the combustor 11 can be prevented. This can minimize an increase in density of the CO gas in the combusted and exhausted gas and prevent a fire in the combustor 11.

Example of Embodiment

Figure 5:
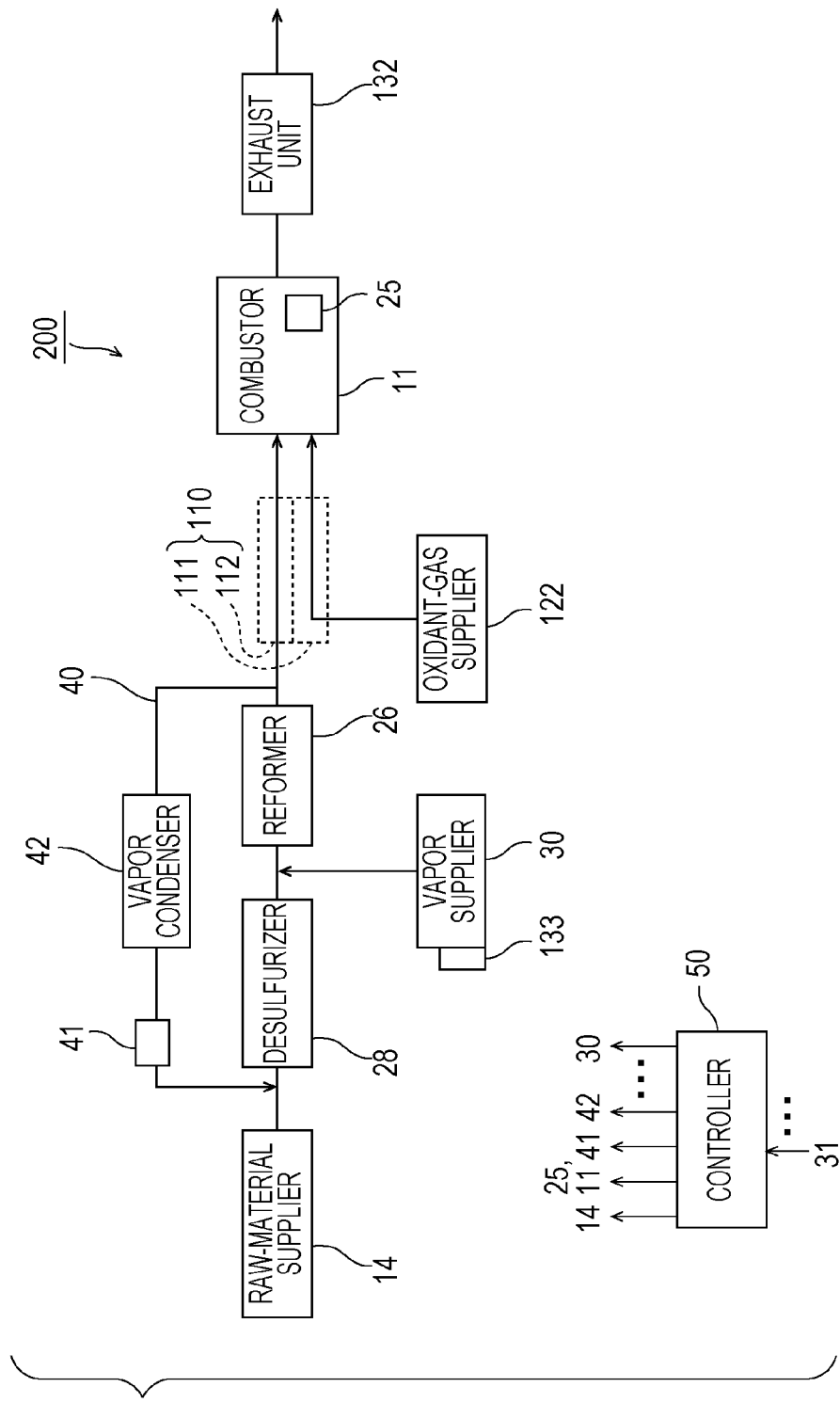
FIG. 5 is a block diagram illustrating a schematic configuration of a fuel cell system according to an example of the embodiment.

An example of the embodiment will be described with reference to FIG. 5. FIG. 5 is a block diagram illustrating a schematic configuration of a fuel cell system 200 according to the example of the embodiment.

As illustrated in FIG. 5, the fuel cell system 200 according to the example of the embodiment includes the reformer 26, the raw-material supplier 14, the desulfurizer 28, the vapor supplier 30, the recycle gas passage 40, the flow controller 41, a fuel cell 110, the combustor 11, and the controller 50. The recycle gas passage 40 is provided with the vapor condenser 42, and the combustor 11 is provided with the igniter 25. The fuel cell system 200 according to the example of the embodiment further includes an oxidant-gas supplier 122, an exhaust unit 132, and a temperature sensor 133.

Specifically, the fuel cell system 200 according to the example of the embodiment includes the fuel cell 110 and is different from the fuel cell system 100 according to the embodiment in that the fuel cell system 200 is provided with the oxidant-gas supplier 122, the exhaust unit 132, and the temperature sensor 133. Accordingly, the same members of the fuel cell system 200 according to the example of the embodiment as those of the fuel cell system 100 according to the embodiment are denoted by the same reference numerals, and description thereof is omitted.

Examples of the fuel cell 110 may include a solid oxide fuel cell. Specifically, the fuel cell 110 includes a plurality of single fuel cells that are connected in series. Each single fuel cell has an anode 112 to which the hydrogen-containing gas is supplied and a cathode 111 to which the oxidant gas is supplied, and a reaction is caused between the anode 112 and the cathode 111 to generate power. In the fuel cell 110, the cell stacks each including the single fuel cells connected in series may be connected parallel to each other.

For example, single fuel cells formed of yttria-doped zerconia (YSZ), ytterbium- or scandium-doped zerconia, or a lanthanum gallate solid electrolyte may be used as the single fuel cells included in the fuel cell 110. Note that the fuel cell 110 is not limited to the solid oxide fuel cell described above and may be, for example, a solid polymer fuel cell.

The desulfurizer 28, the reformer 26, the fuel cell 110, and the combustor 11 may be incorporated into one module but are not particularly illustrated in FIG. 5.

The oxidant-gas supplier 122 supplies the oxidant gas to the cathode 111 of the fuel cell 110. The oxidant gas may be, for example, air.

The exhaust unit 132 exhausts exhaust gas resulting from combustion performed by the combustor 11 to the atmosphere. The exhaust unit 132 may include a purifier for reducing a CO component contained in the exhaust gas.

The temperature sensor 133 is a sensor that senses the temperature of the vapor supplier 30. Information regarding the temperature sensed by the temperature sensor 133 is transmitted to the controller 50. Based on the sensing result of the temperature sensor 133, the controller 50 can determine whether the temperature of the vapor supplier 30 has increased to a temperature needed for water to evaporate in the vapor supplier 30. Note that the temperature sensor 133 may be provided to not only the vapor supplier 30 but also each of the fuel cell 110, the reformer 26, the desulfurizer 28, the exhaust unit 132, and other units. Note that at the temperature needed for water to evaporate in the vapor supplier 30, the temperature of a vapor passage is equal to or higher than a temperature at which vapor is condensed.

Control Method Performed at Startup in Example of Embodiment

A control method performed at the startup of the fuel cell system 200 according to the example of the embodiment will be described with reference to FIG. 6. FIG. 6 is a flowchart illustrating an example of the control method for the fuel cell system 200 according to the example of the embodiment.

The control method illustrated in FIG. 6 can be implemented in such a manner that, for example, the controller 50 reads and executes a program stored in the storage (not illustrated).

First, the controller 50 instructs the fuel cell system 200 in the example of the embodiment to start (START). After the raw-material supplier 14 becomes ready to supply the raw material, the raw-material supplier 14 supplies the raw material in response to a control instruction from the controller 50 (S31). At this time, the controller 50 receives, from a timer (not illustrated), information regarding a raw-material supply time that is a time elapsed after the start of the raw material supply. Then, the controller 50 determines whether a time equal to or longer than a predetermined time T1 has elapsed as the raw-material supply time (step S32). If the controller 50 determines that a time equal to or longer than the predetermined time T1 has elapsed as the raw-material supply time (YES in step S32), the igniter 25 ignites and combusts the raw material (off-gas) in the combustor 11 in response to a control instruction from the controller 50, the raw material (off-gas) being exhausted from the fuel cell 110 (step S33). Flue gas generated by combusting the raw material (off-gas) in this manner is exhausted to the outside of the fuel cell system 200 via the exhaust unit 132.

Note that the predetermined time T1 used for the determination in step S32 is a value set as a time needed for the supplied raw material to replace the substance in a passage from the raw-material supplier 14 to a downstream end of the anode 112 of the fuel cell 110.

After the raw material (off-gas) is combusted in the combustor 11 in step S33, for example, the vapor supplier 30, the desulfurizer 28, the reformer 26, the fuel cell 110, and other components of the fuel cell system 200 are heated by heat of the flue gas generated by the combustion.

The flow controller 41 opens the recycle gas passage 40 that is in the closed state in response to a control instruction from the controller 50. This causes part of the gas (raw material) exhausted from the reformer 26 to start flowing as the recycle gas through the recycle gas passage 40, that is, supply of the recycle gas to the recycle gas passage 40 is started (S34).

After the supply of the recycle gas is started, the controller 50 receives the information regarding the temperature of the vapor supplier 30 from the temperature sensor 133 and determines whether the temperature of the vapor supplier 30 has been equal to or higher than a predetermined temperature T2 (step S35). If the controller 50 determines that the temperature of the vapor supplier 30 has been equal to or higher than the predetermined temperature T2 (YES in step S35), the vapor supplier 30 starts supplying vapor in response to a control instruction from the controller 50 (step S36). Then, the control process performed at the startup of the fuel cell system 200 is terminated (END).

Note that the predetermined temperature T2 may be, for example, 100° C. that is a temperature at which water can evaporate. The vapor supplier 30 may be heated by utilizing the heat of the flue gas generated in the combustor 11 as described above. Further, the vapor supplier 30 may be equipped with an electric heater and may thus be heated by the electric heater.

In the fuel cell system 200 according to the example of the embodiment as described above, when the fuel cell system 200 is started, the controller 50 controls the vapor supplier 30 in such a manner that vapor is supplied after the raw material exhausted as the off-gas via the fuel cell 110 is combusted in the combustor 11. This enables the raw material (off-gas) exhausted from the reformer 26 to be combusted in the combustor 11 before the vapor supply is started. Accordingly, when the raw material has a high moisture content, the combustion of the raw material in the combustor 11 can be prevented, and the deterioration of the combustion state of the combustor 11 can thus be prevented. This can minimize an increase in density of the CO gas in the combusted and exhausted gas and prevent a fire in the combustor 11.

Modification of Example of Embodiment

A modification of the foregoing example of the embodiment will be described. Since the fuel cell system 200 according to the modification of the example of the embodiment has the same configuration as that of the fuel cell system 200 according to the example of the embodiment, the same members are denoted by the same reference numerals, and description thereof is omitted.

Control Method Performed at Startup in Modification of Example of Embodiment

Hereinafter, the control method performed at the startup of the fuel cell system 200 according to the modification of the example of the embodiment will be described with reference to FIG. 7. FIG. 7 is a flowchart illustrating an example of the fuel cell system 200 according to the modification of the example of the embodiment.

The control method illustrated in FIG. 7 can be implemented in such a manner that, for example, the controller 50 reads and executes a program stored in the storage (not illustrated).

First, the controller 50 instructs the fuel cell system 200 according to the modification of the example of the embodiment to start (START). After the raw-material supplier 14 becomes ready to supply the raw material, the raw-material supplier 14 supplies the raw material in response to a control instruction from the controller 50 (S41). At this time, the controller 50 receives information regarding a raw-material supply time from the timer (not illustrated). Then, the controller 50 determines whether a time equal to or longer than the predetermined time T1 has elapsed as the raw-material supply time (step S42). If the controller 50 determines that a time equal to or longer than the predetermined time T1 has elapsed as the raw-material supply time (YES in step S42), the flow controller 41 opens the recycle gas passage 40 that is in the closed state in response to a control instruction from the controller 50. This causes the part of the gas (raw material) exhausted from the reformer 26 to start flowing as the recycle gas through the recycle gas passage 40, that is, supply of the recycle gas to the recycle gas passage 40 is started (S43).

After the supply of the recycle gas to the recycle gas passage 40 is started, the controller 50 receives, from the timer (not illustrated), information regarding a recycle-gas supply time that is a time elapsed after the start of the recycle gas supply. Then, the controller 50 determines whether a time equal to or longer than a predetermined time T3 has elapsed as the recycle-gas supply time (step S44). If the controller 50 determines that a time equal to or longer than the predetermined time T3 has elapsed as the recycle-gas supply time (YES in step S44), the igniter 25 ignites and combusts the raw material (off-gas) in the combustor 11 in response to a control instruction from the controller 50, the raw material (off-gas) being exhausted from the fuel cell 110 (step S45). Flue gas generated by combusting the raw material (off-gas) in this manner is exhausted to the outside of the fuel cell system 200 via the exhaust unit 132.

Note that the predetermined time T3 used for the determination in step S44 is a value set as a time needed for part of the gas (raw material) exhausted from the reformer 26 to replace the substance in the recycle gas passage 40 by flowing therethrough.

After the raw material (off-gas) is ignited and combusted in the combustor 11 in step S45, for example, the vapor supplier 30, the desulfurizer 28, the reformer 26, the fuel cell 110, and other components of the fuel cell system 200 are heated by heat of the flue gas.

The controller 50 receives the information regarding the temperature of the vapor supplier 30 from the temperature sensor 133 and determines whether the temperature of the vapor supplier 30 has been equal to or higher than the predetermined temperature T2 (step S46). If the controller 50 determines that the temperature of the vapor supplier 30 has been equal to or higher than the predetermined temperature T2 (YES in step S46), the vapor supplier 30 starts supplying vapor in response to a control instruction from the controller 50 (step S47). Then, the control process performed at the startup of the fuel cell system 200 is terminated (END).

In the fuel cell system 200 according to the modification of the example of the embodiment as described above, when the fuel cell system 100 is started, the controller 50 controls the vapor supplier 30 in such a manner that vapor is supplied after the raw material exhausted as the off-gas via the fuel cell 110 is combusted in the combustor 11. This enables the raw material (off-gas) exhausted from the reformer 26 to be combusted in the combustor 11 before the vapor supply is started. Accordingly, when the raw material has a high moisture content, the combustion of the raw material in the combustor 11 can be prevented, and the deterioration of the combustion state of the combustor 11 can thus be prevented.

Moreover, the controller 50 controls the flow controller 41 to cause the part of the raw material exhausted from the reformer 26 to flow through the recycle gas passage 40 before the raw material is combusted in the combustor 11. This enables the recycle gas passage 40 to be full of the gas (raw material) exhausted from the reformer 26. This can prevent fluctuation of an amount of the gas to be supplied to the combustor 11, the fluctuation being caused by flowing of the part of the gas into the recycle gas passage 40 during the combustion in the combustor 11. Accordingly, the deterioration of the combustion state of the combustor 11 can be prevented. This can minimize an increase in density of the CO gas in the combusted and exhausted gas and prevent a fire in the combustor 11.

From the description above, modifications and other embodiments of the present disclosure will be obvious to those skilled in the art. The description above should thus be merely construed as an illustrative example and is provided to teach those skilled in the art the best modes for carrying out the present disclosure. The details of the structure and/or the functions of the present disclosure may be substantially modified without departing from the spirit of the present disclosure.

The fuel cell systems in the present disclosure are applicable to a general system that generates hydrogen and causes a reaction of the generated hydrogen.

What is claimed is:

1. A fuel cell system comprising:
   a reformer that generates a hydrogen-containing gas by using a raw material;
   a raw-material supplier that supplies the raw material to the reformer;
   a desulfurizer that desulfurizes, by using hydrodesulfurization, a sulfur compound contained in the raw material supplied to the reformer;
   a recycle gas passage for supplying the desulfurizer with part of gas exhausted from the reformer;
   a flow controller that controls flow of the gas in the recycle gas passage;
   a vapor supplier that supplies vapor to the reformer;
   a fuel cell that causes a reaction of the hydrogen-containing gas generated by the reformer;
   a combustor that ignites and combusts off-gas exhausted from the fuel cell; and
   a controller,
   wherein after causing the raw-material supplier to supply the raw material at a startup of the fuel cell system, the controller is configured to perform control such that:
   (i) before the vapor supplier starts supplying vapor to the reformer, the raw material exhausted as the off-gas via the fuel cell is combusted in the combustor, and the flow controller subsequently causes the part of the gas exhausted from the reformer to start flowing through the recycle gas passage, and
   after the part of the gas exhausted from the reformer starts flowing through the recycle gas passage, the vapor supplier starts supplying the vapor to the reformer, or
   (ii) before the vapor supplier starts supplying vapor to the reformer, the flow controller causes the part of the gas exhausted from the reformer to start flowing through the recycle gas passage, and the raw material exhausted as the off-gas via the fuel cell is subsequently combusted in the combustor, and
   after the off-gas is combusted in the combustor, the vapor supplier starts supplying the vapor to the reformer.

2. A control method for a fuel cell system including a reformer that generates a hydrogen-containing gas by using a raw material, a raw-material supplier that supplies the raw material to the reformer, a desulfurizer that desulfurizes, by using hydrodesulfurization, a sulfur compound contained in the raw material supplied to the reformer, a recycle gas passage for supplying the desulfurizer with part of gas exhausted from the reformer, a flow controller that controls flow of the gas in the recycle gas passage, a vapor supplier that supplies vapor to the reformer, a fuel cell that causes a reaction of the hydrogen-containing gas generated by the reformer, a combustor that ignites and combusts off-gas exhausted from the fuel cell, and a controller, the control method comprising:
   at a startup of the fuel cell system,
      supplying the raw material by the raw-material supplier;
      combusting, by the combustor, the off-gas exhausted via the fuel cell;
      causing, by the flow controller, the part of the gas exhausted from the reformer to flow through the recycle gas passage; and
      supplying the vapor to the reformer by the vapor supplier,
   wherein, at the startup of the fuel cell system, after the supplying of the raw material by the raw-material supplier is performed,
   (i) before the vapor supplier starts supplying vapor to the reformer, the combusting, by the combustor, of the raw material as the off-gas exhausted via the fuel cell is performed, and the causing, by the flow controller, of the part of the gas exhausted from the reformer to start flowing through the recycle gas passage is subsequently performed, and
   after the part of the gas exhausted from the reformer starts flowing through the recycle gas passage, the supplying of the vapor to the reformer by the vapor supplier is started, or
   (ii) before the vapor supplier starts supplying vapor to the reformer, the causing, by the flow controller, of the part of the gas exhausted from the reformer to flow through the recycle gas passage is performed, and the combusting, by the combustor, of the raw material as the off-gas exhausted via the fuel cell is subsequently performed, and after the off-gas is combusted in the combustor, the supplying of the vapor to the reformer by the vapor supplier is started.

\* \* \* \* \*